United States Patent
Watkins

(10) Patent No.: US 12,306,338 B2
(45) Date of Patent: May 20, 2025

(54) FULL DUPLEX RADAR POSITIONAL FEEDBACK AND UPDATE

(71) Applicant: Kabushiki Kaisha Toshiba, Tokyo (JP)

(72) Inventor: Gavin Tomas Watkins, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 536 days.

(21) Appl. No.: 17/833,266

(22) Filed: Jun. 6, 2022

(65) Prior Publication Data

US 2023/0393239 A1      Dec. 7, 2023

(51) Int. Cl.
*G01S 7/41* (2006.01)
*H01Q 3/04* (2006.01)
*H04L 5/14* (2006.01)

(52) U.S. Cl.
CPC .............. *G01S 7/414* (2013.01); *H01Q 3/04* (2013.01); *H04L 5/14* (2013.01)

(58) Field of Classification Search
CPC . G01S 7/023; G01S 7/03; G01S 7/038; G01S 7/414; H01Q 3/04; H04L 5/14
See application file for complete search history.

(56) References Cited

U.S. PATENT DOCUMENTS

| | | | | |
|---|---|---|---|---|
| 4,991,165 A * | 2/1991 | Cronyn | ......... | H04B 1/525 370/278 |
| 8,344,943 B2 * | 1/2013 | Brown | ......... | G01S 13/767 342/147 |
| 9,985,772 B1 * | 5/2018 | Johnson | ......... | H04B 1/525 |
| 10,218,490 B1 * | 2/2019 | Yang | ......... | H04L 5/1461 |
| 10,649,067 B1 * | 5/2020 | Yang | ......... | G01S 7/038 |
| 11,112,486 B2 * | 9/2021 | Hayashi | ......... | G01S 7/038 |
| 11,936,418 B2 * | 3/2024 | Wang | ......... | H04B 1/0475 |

(Continued)

FOREIGN PATENT DOCUMENTS

| CN | 101556328 B | 6/2012 |
|---|---|---|
| EP | 0 547 686 A1 | 6/1993 |

(Continued)

OTHER PUBLICATIONS

U.S. Appl. No. 17/305,272, filed Jul. 2, 2021, Watkins.

(Continued)

*Primary Examiner* — Peter M Bythrow
(74) *Attorney, Agent, or Firm* — Oblon, McClelland, Maier & Neustadt, L.L.P.

(57) ABSTRACT

A radar system comprising: a transmit path; a receive path; an antenna coupled to the transmit path and the receive path; a self-interference cancellation component coupled between the transmit path and the receive path; and a tuning component coupled to the self-interference cancellation component. The tuning component configured to: obtain information identifying a first position of the antenna; determine a tuning parameter based on the information identifying the first position; and transmit the tuning parameter to the self-interference cancellation component. The self-interference cancellation component configured to: apply self-interference cancellation to a first signal received via the receive path based on: the tuning parameter; and a second signal transmitted via the transmit path.

20 Claims, 7 Drawing Sheets

(56) References Cited

U.S. PATENT DOCUMENTS

| | | | |
|---|---|---|---|
| 2006/0139224 A1* | 6/2006 | Tietjen | H01Q 3/26 343/757 |
| 2012/0001791 A1* | 1/2012 | Wintermantel | G01S 7/0233 342/109 |
| 2013/0169468 A1* | 7/2013 | Johnson | G01S 13/34 342/41 |
| 2015/0338504 A1* | 11/2015 | Clark | G01S 7/023 342/359 |
| 2016/0025852 A1* | 1/2016 | Chekroun | G01S 13/904 342/175 |
| 2016/0266245 A1* | 9/2016 | Bharadia | G01S 7/038 |
| 2017/0023664 A1* | 1/2017 | Foreman | G01S 7/2925 |
| 2018/0074168 A1* | 3/2018 | Subburaj | G01S 7/354 |
| 2018/0106884 A1* | 4/2018 | Marr | G01S 7/354 |
| 2018/0358997 A1* | 12/2018 | Shekhar | H04B 1/525 |
| 2020/0142053 A1* | 5/2020 | Qi | G01S 13/89 |
| 2020/0393553 A1* | 12/2020 | Kishigami | G01S 7/036 |
| 2021/0305693 A1* | 9/2021 | Howe | H01Q 25/00 |
| 2021/0373127 A1* | 12/2021 | Slobodyanyuk | G06F 17/16 |
| 2022/0155408 A1 | 5/2022 | Wiffen et al. | |

FOREIGN PATENT DOCUMENTS

| | | |
|---|---|---|
| JP | 2007-170845 A | 7/2007 |
| JP | 2019-219314 A | 12/2019 |

OTHER PUBLICATIONS

U.S. Appl. No. 17/354,647, filed Jun. 22, 2021, Wiffen.

Pan et al., "A Digitally-Assisted Self-Interference Cancellation for Full-Duplex Phased Array Radar," 2019 IEEE International Symposium on Signal Processing and Information Technology (ISSPIT), 2019, pp. 1-5, doi: 10.1109/ISSPIT47144.2019.9001847.

Liu et al., "Suppressing Coupling and Stationary Clutters in FMCW Radars with Temporal Filtering," 2020 IEEE Asia-Pacific Microwave Conference (APMC), 2020, pp. 348-350, doi: 10.1109/APMC47863.2020.9331488.

* cited by examiner

| Antenna Angle (Degrees) | Phase shift (Degrees) | Attenuation (dB) |
|---|---|---|
| ... | ... | ... |
| 182 | XX | XX |
| 183 | XX | XX |
| ... | ... | ... |

| Antenna Angle (Degrees) | Filter Tap 1 Coefficient | Filter Tap 2 Coefficient | ... | Filter Tap N Coefficient |
|---|---|---|---|---|
| ... | ... | ... | ... | ... |
| 182 | XX | XX | ... | XX |
| 183 | XX | XX | ... | XX |
| ... | ... | ... | ... | ... |

FULL DUPLEX RADAR POSITIONAL FEEDBACK AND UPDATE

FIELD

Embodiments described herein relate to a radar system and a method of operating the radar system.

BACKGROUND

Full Duplex (FD) communication is the Simultaneous Transmission And Reception (STAR) of wireless signals on the same frequency at the same time. Full Duplex (FD) technologies have a range of applications. For example, Full Duplex (FD) technologies have been approved as an option for the 802.11ax WiFi standard. Of particular interest is the use of Full Duplex (FD) technologies in radars, in particular in weather radars due to the operating environment being relatively static.

A known Full Duplex (FD) weather radar detects weather features (e.g. cloud formations) and comprises two receiver paths, one receiver path for detecting near objects less than a predetermined distance (referred to herein as the near receive path) and another receiver path for detecting objects greater than the predetermined distance (referred to herein as the far receive path). In this known system it is only necessary to implement Full Duplex (FD) communications for the near receive path since signals (e.g. caused by reflections) are received while the transmit pulse is still being transmitted.

Radar reflections are received in response to transmitting a signal. Some reflections are generated from objects of interest (e.g. cloud formations). Some reflections can also be generated by clutter (e.g. buildings) in the vicinity of the radar antenna. It is desirable to reduce the effect of reflections from clutter in the final image so that the objects of interest (e.g. the cloud formations) can be accurately imaged. To this end, some radar systems use a clutter removal component.

Some radar systems use a rotating dish antenna to scan an area rather than using a static antenna. In radar systems with a static antenna, the clutter (e.g. the reflections from buildings) can be treated as a constant since the antenna does not move and, in general, the surrounding buildings do not move. As a result, the effect of the reflections due to clutter can be reduced by appropriate configuration of the clutter removal component alone. In systems that use a rotating dish antenna, the reflections due to the clutter change as a function of antenna angle because the environment being perceived changes. This presents a challenge to previous clutter removal approaches which rely on the amount of clutter being considered to be static. In light of this a new approach to clutter removal for systems that use rotating dish antennas is desired.

Arrangements of embodiments will be understood and appreciated more fully from the following detailed description, made by way of example only and taken in conjunction with drawings in which.

In the figures, same reference numerals denote same components.

DETAILED DESCRIPTION

Figure 1:
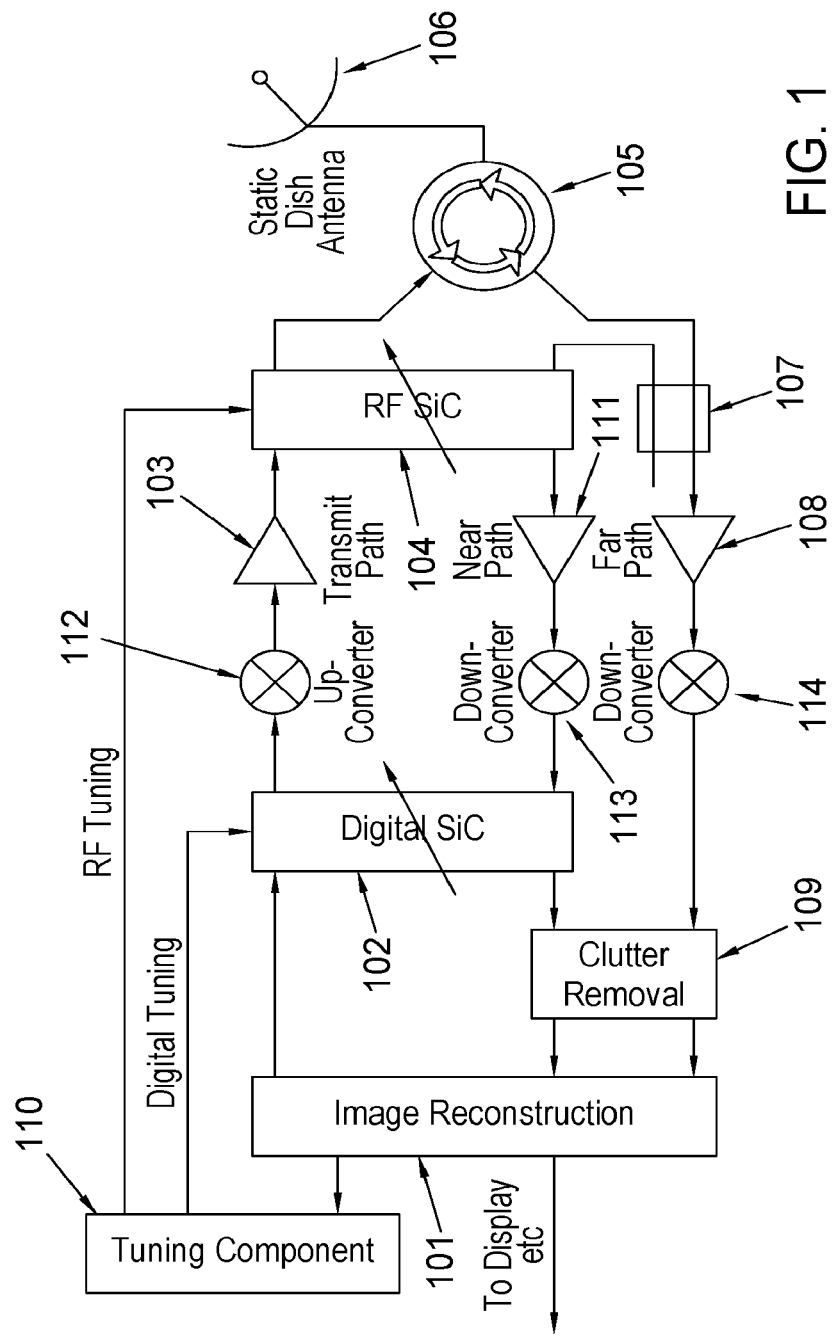
FIG. 1 shows a Full Duplex (FD) radar system according to an example.

According to a first aspect there is provided a radar system comprising: a transmit path; a receive path; an antenna coupled to the transmit path and the receive path; a self-interference cancellation component coupled between the transmit path and the receive path; and a tuning component coupled to the self-interference cancellation component. Wherein the tuning component configured to: obtain information identifying a first position of the antenna; determine a tuning parameter based on the information identifying the first position; and transmit the tuning parameter to the self-interference cancellation component. And wherein the self-interference cancellation component is configured to: apply self-interference cancellation to a first signal received via the receive path based on: the tuning parameter; and a second signal transmitted via the transmit path.

In an embodiment applying self-interference cancellation further comprises: generating a self-interference cancellation signal by modifying the second signal based on the tuning parameter; and combining the first signal and the self-interference cancellation signal.

In an embodiment the receive path comprises a near receive path and a far receive path, and the self-interference cancellation component is coupled between the transmit path and the near receive path.

In an embodiment the radar is a Full Duplex Radar.

In an embodiment the radar is a weather radar.

In an embodiment the antenna is coupled to the transmit path and the receive path via a circulator.

In an embodiment the transmit path is configured to convey a radar pulse to be transmitted by the system and the receive path configured to convey a radar reflection, received via the antenna, in response to transmitting the radar pulse.

In an embodiment the radar system further comprises a controller configured to move the antenna from the first position to a second position; and the tuning component is further configured to: obtain information identifying the second position of the antenna; determine a second tuning parameter based on the information identifying the second position; and transmit the second tuning parameter to the self-interference cancellation component. And wherein the self-interference cancellation component is further configured to: apply self-interference cancellation to the first signal received via the receive path based on the second tuning parameter and the second signal transmitted via the transmit path in response to receiving the second tuning parameter.

In an embodiment the radar system further comprises a controller configured to move a position of the antenna to a second position and wherein the antenna is configured to transmit information identifying the second position of the antenna to the tuning component.

In an embodiment moving the position comprises changing the direction that the antenna is facing.

In an embodiment the tuning component is further configured to transmit the second tuning parameter to the self-interference cancellation component in response to determining that the second tuning parameter is different to the tuning parameter.

In an embodiment the second tuning parameter is different to the tuning parameter if a difference in value between the second tuning parameter and the tuning parameter is greater than a predetermined threshold percentage and/or threshold.

In an embodiment the information identifying the first position of the antenna comprises information indicating an angular direction of the antenna.

In an embodiment the information identifying the position of the antenna is an angle.

In an embodiment the antenna is coupled to the tuning component and wherein the antenna is further configured to transmit the information identifying the first position of the antenna to the tuning component.

In an embodiment the antenna comprises a first input/output coupled to the transmit path and the receive path and a second output coupled to the tuning component.

In an embodiment the tuning component comprises a plurality of tuning parameters, wherein each tuning parameter in the plurality of tuning parameters is associated with a different angle of the antenna.

In an embodiment the tuning component stores a plurality of tuning parameters, wherein each tuning parameter in the plurality of tuning parameters is associated with a different angle of the antenna.

In an embodiment the plurality of angles comprises a number of angles equal to an angular range of the antenna divided by an angular step/resolution. In an embodiment angle of the antenna is the angular direction that the antenna dish is facing.

In an embodiment the tuning component comprises a look-up table comprising the plurality of tuning parameters.

In an embodiment the radar system further comprises: a second self-interference cancellation component coupled between the transmit path and the receive path; and the tuning component is further configured to: determine a second tuning parameter based on the information identifying the first position; and transmit the second tuning parameter to the second self-interference cancellation component. And the second self-interference cancellation component is configured to: apply self-interference cancellation to a third signal provided via the receive path based on: the second tuning parameter and the second signal transmitted via the transmit path.

In an embodiment the third signal received via the receive path comprises an output signal from the self-interference cancellation component.

In an embodiment the second-self interference cancellation component is a Digital SiC component.

In an embodiment the tuning component is configured to operate in a tuning mode and wherein in the tuning mode the tuning component is configured to: cause the antenna to be moved to a second position; determine a second tuning parameter by tuning the self-interference cancellation component; and store the second tuning parameter associated with the second position.

In an embodiment in the tuning mode the tuning component is further configured to: cause the antenna to be moved to a third position; determine a third tuning parameter that minimizes a metric in the first signal; and store the third tuning parameter associated with the third position.

In an embodiment the tuning mode further comprises repeatedly: moving the antenna, determining a tuning parameter at each angle of the antenna, wherein the tuning parameter is determined such that, when the self-interference cancellation component is configured according to the tuning parameter, a metric associated with the first signal is minimized; and storing the tuning parameter associated with the angle of the antenna.

In an embodiment tuning the self-interference cancellation component comprises determining a value of the second tuning parameter that minimizes an amount of self-interference in a signal outputted by the self-interference cancellation component.

In an embodiment the antenna is a rotating dish antenna.

In an embodiment the self-interference cancellation component is a digital self-interference cancellation component or a Radio Frequency self-interference cancellation component.

In an embodiment the self-interference cancellation component is the digital self-interference cancellation component and comprises a Finite Impulse Response Filter.

In an embodiment the self-interference cancellation component is the Radio Frequency self-interference cancellation component and comprises a variable attenuator and phase shifter.

In an embodiment the digital self-interference cancellation component takes an input comprising a digital base band representation of a radar pulse to be transmitted and the Radio Frequency self-interference cancellation component takes an input comprising a radio frequency representation of a radar pulse to be transmitted.

According to a second aspect there is provided a method of operating a radar system, the radar system comprising: a transmit path; a receive path; an antenna coupled to the transmit path and the receive path; a self-interference cancellation component coupled between the transmit path and the receive path; and a tuning component coupled to the self-interference cancellation component. The method comprising: obtaining, by the tuning component, information identifying a first position of the antenna; determining, by the tuning component, a tuning parameter based on the information identifying the first position; transmitting, by the tuning component, the tuning parameter to the self-interference cancellation component, and applying, by the self-interference cancellation component, self-interference cancellation to a first signal received via the receive path based on: the tuning parameter and a second signal transmitted via the transmit path.

In an embodiment the system further comprises a controller configured to move the antenna; and the method further comprises: moving, by the controller, the antenna from the first position to the second position; obtaining, by tuning component, information identifying the second position of the antenna; determining, by the tuning component, a second tuning parameter based on the information identifying the second position; transmitting, by the tuning component, the second tuning parameter to the self-interference cancellation component; and applying, by the self-interference cancellation circuit, self-interference cancellation to the first signal received via the receive path based on the second tuning parameter and the second signal transmitted via the transmit path in response to receiving the second tuning parameter.

In an embodiment the method further comprises: transmitting, by the tuning component, the second tuning parameter to the self-interference cancellation component in response to determining that the second tuning parameter is different to the tuning parameter.

In an embodiment the information identifying the first position of the antenna comprises information indicating an angular direction of the antenna.

In an embodiment the tuning component comprises a plurality of tuning parameters, wherein each tuning parameter in the plurality of tuning parameters is associated with a different angle of the antenna.

In an embodiment the tuning component comprises a look-up table comprising the plurality of tuning parameters.

In an embodiment the radar system further comprises a second self-interference cancellation component coupled between the transmit path and the receive path. And the method further comprises: determining, by the tuning component, a second tuning parameter based on the information identifying the first position; and transmitting, by the tuning component, the second tuning parameter to the second self-interference cancellation component; and applying, by the second self-interference cancellation component, self-interference cancellation to a third signal provided via the receive path based on: the second tuning parameter and the second signal transmitted via the transmit path.

In an embodiment the tuning component is configured to operate in a tuning mode and wherein when configured in the tuning mode, the method further comprises: causing, by tuning component, the antenna to be moved to a second position; determining, by the tuning component, a second tuning parameter by tuning the self-interference cancellation component; and storing, by the tuning component, the second tuning parameter associated with the second position.

In an embodiment tuning the self-interference cancellation component comprises determining a value of the second tuning parameter that minimizes an amount of self-interference in a signal outputted by the self-interference cancellation component.

According to a third aspect there is provided a non-transitory computer-readable medium comprising computer program instructions suitable for execution by a processor, the instructions configured, when executed by the processor, to perform the functionality of a tuning component.

According to a fourth aspect there is provided a radar system comprising: a transmit path; a receive path; an antenna coupled to the transmit path and the receive path; a self-interference cancellation component coupled between the transmit path and the receive path; wherein the self-interference cancellation component is configured to receive a tuning parameter and apply self-interference cancellation based on the tuning parameter and a second signal transmitted via the transmit path; and a tuning component coupled to the self-interference cancellation component. The tuning component configured to: obtain information identifying a first position of the antenna; determine a first tuning parameter by tuning the self-interference cancellation component; store the first tuning parameter associated with the first position; cause the antenna to be moved to a second position; determine a second tuning parameter by tuning the self-interference cancellation component; and store the second tuning parameter associated with the second position.

In an embodiment the tuning component is further configured when determining the first tuning parameter by tuning the self-interference cancellation component, to: obtain a value of the tuning parameter used by the self-interference cancellation component that minimizes an amount of self-interference in an output signal of the self-interference cancellation component.

According to a fifth aspect there is provided a radar system comprising: a transmit path; a receive path; an antenna coupled to the transmit path and the receive path; a self-interference cancellation component coupled between the transmit path and the receive path; wherein the self-interference cancellation component is configured to receive a tuning parameter and apply self-interference cancellation based on the tuning parameter and a second signal transmitted via the transmit path; a tuning component coupled to the self-interference cancellation component. The method comprising: obtaining, by the tuning component, information identifying a first position of the antenna; determining, by the tuning component, a first tuning parameter by tuning the self-interference cancellation component; storing, by the tuning component, the first tuning parameter associated with the first position; causing, by the tuning component, the antenna to be moved to a second position; determining, by the tuning component, a second tuning parameter by tuning the self-interference cancellation component; and storing, by the tuning component, the second tuning parameter associated with the second position.

FIG. 1 shows a Full Duplex (FD) radar system according to an example. In an example, the radar system shown in FIG. 1 is used as a weather radar. FIG. 1 shows a Full Duplex (FD) radar system that uses a single frequency channel and comprises two receiver paths, one receiver path for detecting near objects less than a predetermined distance (referred to herein as the near receive path) and another receiver path for detecting objects greater than the predetermined distance (referred to herein as the far receive path). In an example, the predetermined distance is determined based on the length (in time) of the transmitted pulse. In an example the transmitted pulse has a duration of 38 μs. This is equivalent to a return echo of 6 Kilometers (i.e. 6 Kilometers there and 6 Kilometers back). In this case the far receive path is used for receiving echoes further than 6 Kilometers, whereas the near receive path is used for receiving echoes closed than 6 Kilometers. In the system of FIG. 1, Full Duplex (FD) communications are only implemented on the near receive path since signals (e.g. caused by reflections) are observed on this receive path while the transmit pulse is still being transmitted.

A known challenge with Full Duplex (FD) technologies is achieving sufficient self-interference cancellation. Self-interference can arise in Full Duplex (FD) technologies when a high power transmit signal leaks into the receiver path. Achieving sufficient Self-Interference Cancellation (SiC) enables detection of the desired signal (e.g. a reflection from a distant object), which has a power many orders of magnitude (100+ dB) lower than the signal being transmitted.

As will be discussed in more detail, Self-Interference (SI) can originate from a number of different sources. For example, Self-Interference (SI) can result from the limited isolation provided by a circulator, causing part of the transmit signal applied to a first port of the circulator to leak into a received signal outputted on a third port of the circulator. For example, the circulator typically provides approximately 20 decibels (dB) of isolation between the port connected to the transmit path and the port connected to the receive path. In this case, for a transmit power of 100 Watts, a power of 1 Watt leaks through the circulator to the receive path making it more challenging to identify the desired signal.

Self-interference (SI) can also be caused by electrical leakage paths and electromagnetic reflections in the local propagation environment. Electrical leakage paths could arise within the transceiver itself due to electromagnetic coupling between the transmitter chain (i.e. the sequence of components forming the transmitter) and the receiver chain (i.e. the sequence of components forming the receiver).

Furthermore, Self-Interference can also be caused by reflections due to antenna mismatch (causing a portion of the transmit waveform to be reflected back to the receive path). For example, there can be a mismatch between the antenna and the transmit path which causes a portion of the transmitted signal to be reflected back to the receive path. The power of this reflected signal can be of a similar level to the leakage power of the circulator (e.g. 1 Watt).

For weather radars Self-Interference Cancellation in the order of 160 decibels (dB) is required between transmit and receive paths due to the large transmit powers of around 100 Watts (W). Furthermore, some weather radars have even greater transmit powers, in the order of Kilowatts, so higher Self-Interference Cancellation could be required. To this end, the system shown in FIG. 1 uses a combination Radio Frequency (RF) Self-Interference Cancellation (SiC) and Digital Self-Interference Cancellation (SiC) to reduce the amount of Self-Interference (SI) in the output signal.

The system of FIG. 1 comprises an image reconstruction component 101. The image reconstruction component 101 is configured to generate a baseband representation of the radar pulse and output the baseband representation on a first output. In an example, the image reconstruction component 101 generates a baseband representation of the radar pulse based on a number of parameters including, but not limited to, the length of the pulse, when the pulse is sent, and how often the pulse is set. The image reconstruction component 101 is also configured to receive the signal from a radar dish antenna (via the near receive path or the far receive path) and generate an image of the region surrounding the antenna based on the signals received by the radar dish antenna (e.g. using the echoes reflected from objects in the surrounding objects).

The first output of the image reconstruction component 101 is coupled to a first input of a Digital Self-Interference Cancellation (SiC) component 102. The Digital Self-Interference Cancellation (SiC) component 102 is configured to generate a modified version of the transmit signal that is used to (at least partially) cancel the self-interference present in the received signal. In an example, a baseband digital representation of a transmit waveform is provided on the first input of the Digital Self-Interference Cancellation (SiC) component 102. A first output of the Digital Self-Interference Cancellation (SiC) component 102 is coupled to an up-converter 112. The Digital Self-Interference Cancellation (SiC) component 102, is configured to output the signal inputted on the first input, on the first output. Or put in other words, the Digital Self-Interference Cancellation (SiC) component 102 is configured to output the unchanged input signal on the first output.

Figure 2A:
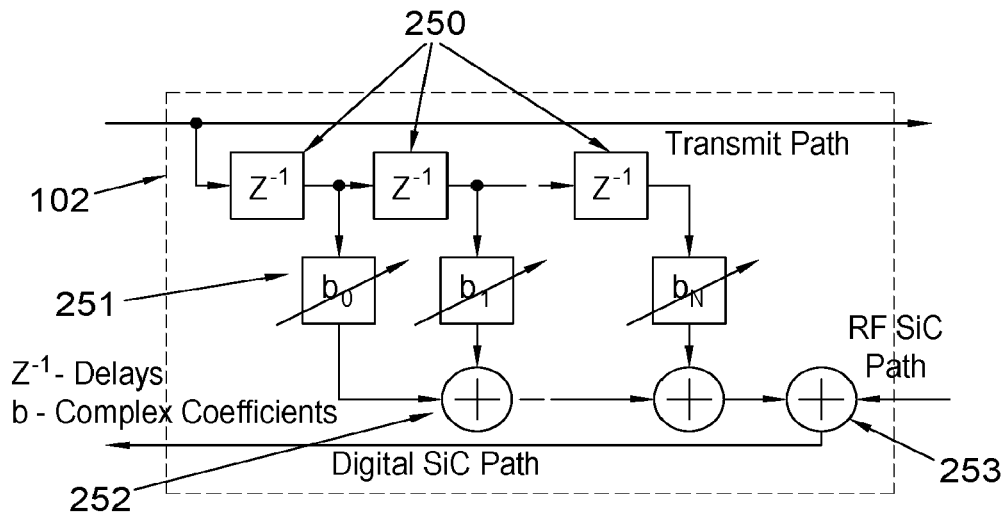
FIG. 2A shows an implementation of a Digital Self-Interference Cancellation (SiC) component 102 according to an example.

FIG. 2A shows an implementation of a Digital Self-Interference Cancellation (SiC) component 102 according to an example. In the implementation of FIG. 2A, the Digital Self-Interference Cancellation (SiC) component 102 comprises a Finite Impulse Response (FIR) filter. Optionally, the Finite Impulse Response (FIR) filter is a multi-tap filter.

The filter in FIG. 2A comprises a plurality of delay elements 250. Each delay element in the plurality of delay elements is configured to delay an input to the delay element by a clock cycle. An output of each delay element in the plurality of delay elements 250 is coupled to a scaling component 251 from a plurality of scaling components. The scaling component 251 is configured scale the input based on a coefficient. In an example the coefficients are real valued. In another example the coefficients are complex (i.e. contain a real and imaginary component).

As known in the art, a multi-tap Finite Impulse Response (FIR) filter comprises a repeated structure, which comprises one or more delay elements, scaling components and combiners. In an example, the output of a first delay element is coupled to an input of a second delay element (as well as an input of a first scaling component). This structure repeats, for example, the output of a second delay element is coupled to an input of a third delay element (as well as a second scaling component). The output of each scaling component is coupled to a combiner (or equivalently a plurality of chained combiners 252 as shown in FIG. 2A). The combiner is configured to combine the scaled-delayed-inputs, to form a self-interference cancellation signal.

The number of delay-scale-accumulate components in the filter depends on the size of the FIR filter and the number of FIR filter taps. However, in essence, the FIR filter in the digital self-interference cancellation component is configured to generate an output based on a weighted sum of recent input values. The weights used (i.e. the coefficients applied by each scaling components) are provided via a third input of the Digital Self-Interference Cancellation (SiC) component 102 from a tuning component 110.

The output of the FIR filter comprises a weighted sum of the recent input values. The output of the FIR filter is coupled to an input of a final combiner 253. A second input of the Digital Self-Interference Cancellation (SiC) component 102 is coupled to the near receive path (specifically the output of a Low Noise Amplifier 111).

As will be discussed in more detail below, the second input is configured to receive a digital signal, generated by amplifying and down-converting a received Radio Frequency signal that has been compensated with RF self-interference signal cancellation. A second input of the final combiner 253 is coupled to the second input of the Digital Self-Interference Cancellation (SiC) component 102. The final combiner 253 is configured to combine an output of the FIR filter (i.e. a weighted sum of the recent transmit signal) and the second input of the Digital Self-Interference Cancellation (SiC) component 102 to generate a compensated receive signal. An output of the final combiner 253 is coupled to a second output of the Digital Self-Interference Cancellation (SiC) component 102.

The first output of the Digital Self-Interference Cancellation (SiC) filter 102 is coupled to an input of an up-converter 112. The up-converter 112 is configured to convert a signal from a lower frequency to a higher frequency. In an example the up-converter 112 is configured to convert the digital baseband representation of the transmit waveform to a Radio Frequency (RF) signal with a frequency higher than the digital baseband representation. The up-converter 112 is configured to output the up-converted signal on an output of the up-converter 112. In an example, the digital baseband representation at the input of the up-converter 112 operates at a frequency of 50 MHz and the RF output signal, outputted on the output of the up-converter 112 is at a frequency of 9.45 GHz. The output of the up-converter 112 is coupled to an input of the Radio Frequency (RF) Amplifier 103.

The Radio Frequency (RF) amplifier 103 is configured to amplify the transmit signal (i.e. the RF signal outputted by the up-converter 112) to a transmit power. An output of the Radio Frequency (RF) amplifier 103 is coupled to a first input of a Radio Frequency (RF) Self-Interference Cancellation (SiC) component 104.

The Radio Frequency Self-Interference Cancellation (RF SiC) component 104 is configured to adjust the amplitude and phase of the input signal (which corresponds to the Radio Frequency (RF) transmit signal) in order to produce an approximate replica of the self-interference in the analogue domain. This modified signal is then used to (at least partially) cancel the self-interference present in the received signal.

The Radio Frequency Self-Interference Cancellation (RF SiC) component 104 has a first input configured to receive a Radio Frequency (RF) signal from the output of the Radio Frequency (RF) amplifier 103. The Radio Frequency Self-Interference Cancellation (RF SiC) component 104 comprises a first output. The first output is coupled to a first port of a circulator 105 (discussed in more detail below).

The Radio Frequency Self-Interference Cancellation (RF SiC) component 104 is configured to output the Radio Frequency (RF) signal (that was received on the first input) on the first output. Put in other words, the Radio Frequency Self-Interference Cancellation (RF SiC) component 104 is configured to output the input Radio Frequency (RF) signal to the circulator 105 unmodified. Like the Digital Self-interference Cancellation component 302, the Radio Frequency Self-Interference Cancellation (RF SiC) component 104 is also configured to modify the received input signal to generate a modified signal. The modified signal is subsequently used to reduce the effect of Self-Interference in the received signal.

In an example, the Radio Frequency Self-Interference Cancellation (RF SiC) component 104 comprises a cancellation filter configured to apply variable phase shifts and variable attenuations to a copy of the transmit signal in order to create a signal that approximately cancels the Self-Interference (SI). In an example, the Radio Frequency Self-Interference Cancellation (RF SiC) component 104 comprises a multi-tap filter that also includes at least one delay component, which is configured to delay the input signal before applying a phase shift and an attenuation.

Figure 2B:
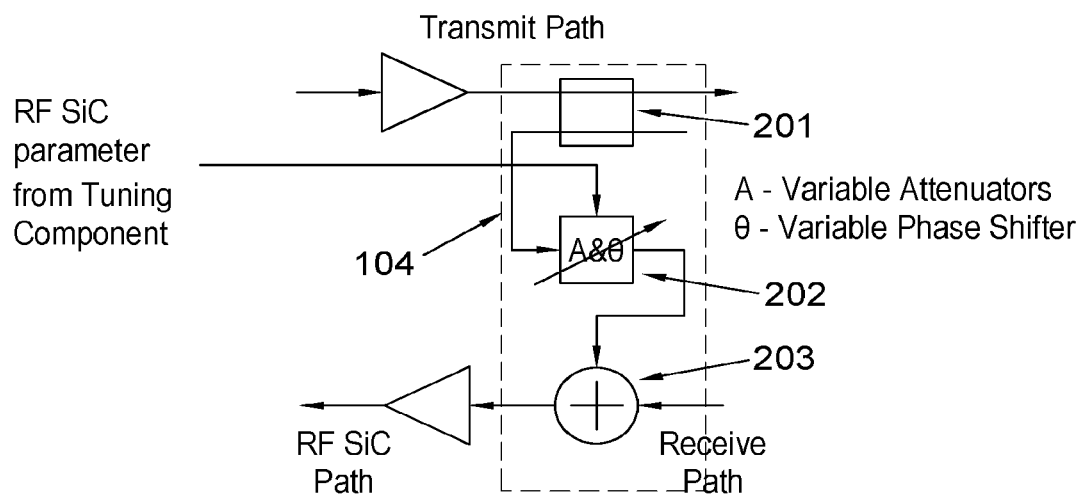
FIG. 2B shows an implementation of an RF Self-Interference Cancellation (RF SiC) component 104 according to an example.

FIG. 2B shows an implementation of an RF Self-Interference Cancellation (RF SiC) component 104 according to an example. In the implementation of FIG. 2B, the RF Self-Interference Cancellation (RF SiC) component 104 comprises a first directional coupler 201, a circuit comprising a variable attenuator and phase shifter 102, and a combiner 103.

As known in the art, a directional coupler is a passive electronic device that couples a defined amount of power from a transmission line that extends through the directional coupler, to another port of the directional coupler. This enables a portion of the signal that is present on the transmission line through the directional coupler to be used in another part of the circuit.

A directional coupler comprises four ports. An input port (port 1), where power is applied. A transmitted port (port 2) where power from the input port is outputted. A coupled port (port 3) where a portion of the power applied to the input port (port 1) appears and an isolated port (port 4). The coupled port (port 3) can also be referred to as the forward coupled port and the isolated port (port 4) can also be referred to as the reverse coupled port. The amount of power outputted from the transmitted port (port 2) is equal to the amount of power inputted on the input port (port 1) minus the power coupled to the coupled port (port 3).

The first directional coupler 201 is coupled between a first input of the RF SiC component 104 and a first output of the RF SiC component 104. The first directional coupler 201 is configured to couple a portion of the transmit signal received via the first input (e.g. from an output of the RF power amplifier 103) to the filter components. The remaining (i.e. the uncoupled) portion of the input signal is transmitted via the first output to the circulator 105 for subsequent transmission via the antenna 106.

In an example, the first input of the RF SiC component 104 is coupled to a first port of the first directional coupler 201, a second port of the first directional coupler 201 is coupled to the first output of the RF SiC component 104, the first port and the second port are electrically connected, and a third port of the first directional coupler 201 is coupled to the filter comprising the variable attenuator and phase shifter 202. Optionally, the variable attenuator and phase shifter 202 are implemented using separate components (e.g. an attenuator, and separately, a phase shifter).

The variable attenuator and phase shifter 202 comprises two inputs and one output. A first input of the variable attenuator and phase shifter 202 is coupled to a third port of the first directional coupler 201 (which outputs a portion of the transmit signal conveyed between the first port and the second port of the directional coupler 201). As a result, the variable attenuator and phase shifter 202 is configured to receive a portion of the transmit signal (i.e. the radar pulse).

The variable attenuator and phase shifter 202 is configured to attenuate (or in other words, reduce the amplitude of) the received signal and modify the phase of the received signal.

The second input of the variable attenuator and phase shifter 202 is coupled to a first output of the tuning component 110. The variable attenuator and phase shifter 202 is configured to receive information identifying a configuration of the variable attenuator and phase shifter 202 via the second input. In an example, the information identifying a configuration of the variable attenuator and phase shifter 202 is conveyed in a control signal transmitted by the tuning component 110, where the control signal operates at a low frequency (e.g. at a frequency lower than the RF signal outputted by the up-converter 112). In an example, the information identifying the configuration of the variable attenuator and phase shifter 202 comprises information identifying an amount of attenuation and an amount of phase shift to be applied. This information is also referred to herein as a tuning parameter or an RF SiC parameter.

In an example, the tuning component 110 is configured to output an RF SiC parameter, the RF SiC component 104 is configured to receive the RF SiC parameter via the second input and configured to configure the variable attenuator and phase shifter 202 according to the received parameter. An output of the variable attenuator and phase shifter 202 is coupled to the combiner 203. The output of the variable attenuator and phase shifter 202 is a self-interference cancellation signal (corresponding to an attenuated and phase shifted version of the transmit signal).

The combiner 203 is configured to combine the self-interference signal (generated by modifying the amplitude and phase of the transmit signal) with a received signal (provided on the near receive path). In an example, the combiner 203 is configured to sum the self-interference signal and the received signal to generate a combined signal.

The RF SiC component 104 also comprises a second output. The second output is coupled to an input of a first Low Noise Amplifier (LNA) 111 of the near receive path. The RF SiC component 104 is configured to output the combined signal on the second output by coupling an output of the combined to the second output. Appropriate configuration of the attenuator and phase shifter in the RF SiC component 104 results in an output signal in which the effects of self-interference are minimized, thereby improving signal quality and enabling the desired signal to be more accurately detected.

In the example shows in FIG. 2B, the RF Self-Interference Cancellation (SiC) Component 104 comprises a variable attenuator and a phase shifter. For the avoidance of doubt, it is emphasized that the circuit that attenuates and phase shifts the input signal may be implemented in different ways. In an example, the circuit for attenuating and phase shifting the input signal comprises more than one analogue "taps" that each take a portion of the transmit signal from the transmitter chain and optionally apply a delay, in addition to a phase-shift, and an attenuation to the signal before coupling the generated signal to the receiver chain prior to the received signal being inputted into a first Low Noise Amplifier (LNA) 111.

In a specific example, the circuit for attenuating and phase shifting the input signal in the Radio Frequency Self-Interference Cancellation (RF SiC) component 104 comprises an analogue cancellation filter comprising one taps, having a delay component to delay the input signal, a variable attenuator to attenuate the input signal and a variable phase shifter to shift the phase of the input signal. The tuneable elements of the tap (i.e. the variable phase shifter and the variable attenuator) are set according to the RF SiC parameter from the tuning component 110. In other examples the analogue cancellation filter comprises more than one tap.

The Radio Frequency Self-Interference Cancellation (RF SiC) component 104 also comprises a third input, which in the example of FIG. 1 is coupled to the receive path of the system. The third input is configured to receive a received RF signal. In an example, the signal received at the third input is combined with the self-interference cancellation signal to generate the combined RF Signal.

Returning to FIG. 1, the system of FIG. 1 also comprises a circulator. The circulator 105 comprises three input/output ports. As known in the art, a circulator is a passive device that is used to control the direction of signal flow in an electronic circuit. It is common in radar systems for there to be a single antenna for reception and transmission. Consequently, the circulator 105 is used in the system of FIG. 1 to provide isolation between the transmit path and the receive path.

A first port of the circulator 105 is coupled to the first output of the Radio Frequency Self-Interference Cancellation (RF SiC) component 104. A second port of the circulator 105 is coupled to a static dish antenna 106. A third port of the circulator 105 is coupled to a second directional coupler 107 in the receive path.

In the system of FIG. 1 the second directional coupler 107 is used to split the signal outputted by the third port of the circulator 105 into two components, a first component for processing by the near receive path and a second component for processing by the far receive path.

In the system of FIG. 1, the input port (port 1) of the second directional coupler 107 is coupled to the third port of the circulator 105, the transmitted port (port 2) is coupled to an input port of a second Low Noise Amplifier (LNA) 108 and the coupled port (port 3) is coupled to the third input of the Radio Frequency Self-Interference Cancellation (RF SiC) component 104. In this way, a portion of the signal received by the static dish antenna 106 and subsequently output on the third port of the circulator 105 is applied to the third input of the Radio Frequency Self-Interference Cancellation (RF SiC) component 104 for self-interference cancellation.

Considering the near receive path in more detail first. As discussed above, the coupled port (port 3) of the second directional coupler 107 is coupled to the third input of the Radio Frequency Self-Interference Cancellation (RF SiC) component 104. The input signal (i.e. a portion of the received signal) is combined with the self-interference cancellation signal (i.e. a modified version of the transmitted signal) generated by the RF SiC filter to generate a modified RF signal. The modified RF signal is outputted to an input of the first Low Noise Amplifier (LNA) 111 via the second output of the Radio Frequency Self-Interference Cancellation (RF SiC) component 104.

The first Low Noise Amplifier (LNA) 111 is configured to amplify the modified RF signal.

In an example there is provided a Radio Frequency Limiter (not shown) between the output of the RF Self-Interference Cancellation (RF SiC) component 104 and the input of the first Low Noise Amplifier (LNA) 111, that is configured to limit the power of the input signal to the first Low Noise Amplifier (LNA) 111 as a backup in order to protect the amplifier.

The output of the first Low Noise Amplifier (LNA) 111 is coupled to an input of a first down-converter 113. The first down-converter 113 is configured to downconvert (i.e. reduce the frequency of) the input signal from a Radio Frequency signal (e.g. the transmission signal frequency) to a baseband signal. An output of the first down-converter 113 is coupled to an input (specifically the second input) of the Digital Self-Interference Cancellation (Digital SiC) component 102.

As discussed above, the Digital Self-Interference Cancellation (Digital SiC) component 102 is configured to generate a self-interference cancellation signal based on an input signal and received filter coefficients. The Digital SiC component 102 is further configured to combine the generated self-interference cancellation signal with near receive path signal. The Digital Self-Interference Cancellation component 102 subsequently outputs the combined signal (i.e. the combination of the self-interference cancellation signal and the near receive path signal) on a third output.

The third output of the Digital Self-Interference Cancellation component 102 is coupled to a clutter removal component 109, specifically a first input of the clutter removal component 109. As discussed above, clutter includes an unwanted reflected (otherwise referred to as an echo) from an object within the radar's detection range. In this context, an unwanted reflection, is a reflection of the radar signal that is caused by an object which is not being or intended to be observed (e.g. a reflection from a building, when the radar is being used to observe the weather). The clutter removal component is configured to remove clutter (e.g. unwanted reflections) from the near receive path signal.

In an example the clutter removal 109 component comprises a multi-tap filter. In an example the filter is implemented using a digital baseband filter which filters the signal outputted by Digital Self-Interference cancellation component 102 to further suppress, and optionally remove, the unwanted signals.

Figure 2C:
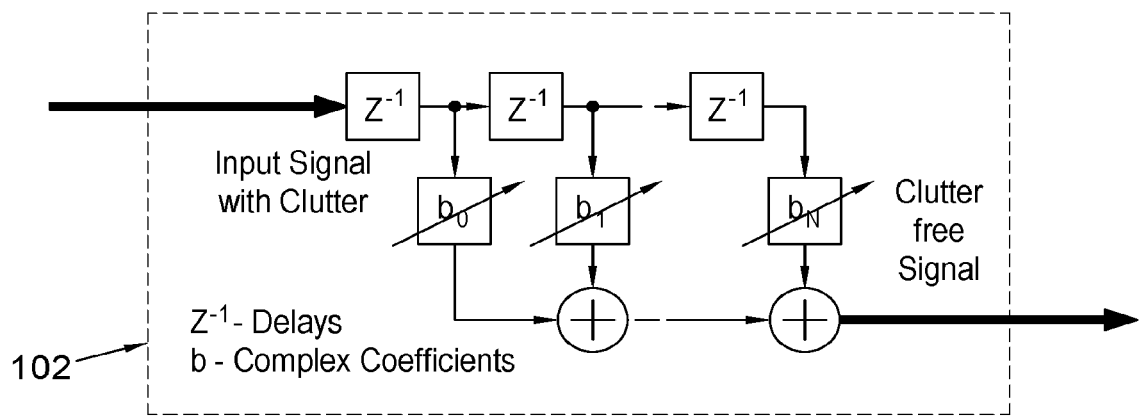
FIG. 2C shows an implementation of part of a clutter removal component according to an example.

FIG. 2C shows an implementation of part of a clutter removal component according to an example. In particular, FIG. 2C shows a first input of the clutter removal component 109 coupled to a Finite Impulse Response (FIR) filter. The output of the Finite Impulse Response (FIR) filter is coupled to a first output. The FIR filter structure shown in FIG. 2C has the same features as the FIR filter structure described in relation to FIG. 2A. However, the coefficients will likely have different values to the Digital (FIR) filter in FIG. 2A.

In an example the clutter removal component 109 comprises two Finite Impulse Response (FIR) filters. A first Finite Impulse Response (FIR) filter is coupled between a first input and a first output and is configured to remove clutter from the signal on the near receive path. A second Finite Impulse Response (FIR) filter is coupled between a second input and a second output and is configured to remove clutter from a signal received on the far receive path. In an example the weights of the FIR filters (i.e. the complex coefficients) are predetermined. In one example, the FIR filter weights/coefficients in the clutter removal component 109 are generated as part of a calibration routine. In another example the FIR filter weights/coefficients in the clutter removal component 109 are determined by averaging a plurality of sweeps of the radar antenna to obtain the reflections/echoes that are static and then generating FIR filter weights that remove or reduce the presence of the reflections from static objects from the received signal. In yet another example the weights of the FIR filters are provided to the clutter removal component 109 by an external component.

The outputs of the clutter removal component 109 are coupled to the image reconstruction component 101. The image reconstruction component 101 is configured to generate a representation of the received signal. For example, an image indicating where an object is detected. A first output of the image reconstruction component 101 is coupled to a display which is configured to display the image.

Considering the far receive path in more detail. The transmitted port (i.e. port 2) of the second directional coupler 107 is coupled to an input of a second Low Noise Amplifier (LNA) 108. The second Low Noise Amplifier (LNA) 108 is configured to amplify the received input signal. The amplified signal is outputted on an output of the second Low Noise Amplifier (LNA) 108. The output of the second Low Noise Amplifier (LNA) 108 is coupled to an input of a second down-converter 114.

In an example there is provided a limiter (not shown) between the transmitted port (i.e. port 2) of the second directional coupler 107 and the input of the second Low Noise Amplifier (LNA) 108. The limiter is configured to limit the power of the received signal in order to prevent damage to downstream components.

The second down-converter 114 is configured to down-convert the received RF signal inputted on an input of the second down-converter 114 to a baseband signal outputted on an output of the second down-converter 114. The output of the second Low Noise Amplifier (LNA) 108 is coupled to a second input of the clutter removal component 109.

The clutter removal component 109 is configured to remove clutter from the signal on the second input. In an example the clutter removal component 109 uses a second Finite Impulse Response (FIR) filter and a set of filter weights to remove clutter in the signal on the far receive path. The signal is subsequently outputted on a second output. The second output is coupled to a third input of the image reconstruction component 101.

As discussed above, the image reconstruction component 101 is configured to generate information identifying an image based on the second input (from the near receive path) and the third input (from the far receive path). In an example, the image reconstruction component 301 uses the signal received from the near receive path for identifying objects less than a predetermined distance (e.g. 6 Kilometers), and the signal from the far receive path for identifying objects greater than the predetermined distance.

The system in FIG. 1 also comprises a tuning component 110. The tuning component 110 is configured to output parameters for configuring the Digital Self-Interference Cancellation (SiC) component 102, and the Radio frequency Self-Interference Cancellation (SiC) component 104.

As discussed above, both the Digital Self-Interference Cancellation (SiC) component 102 and the RF Self-Interference Cancellation (SiC) component 104 are configured to generate self-interference cancellation signals by modifying an input signal (corresponding to the transmit signal) according to tuning parameters received form the tuning component 110.

In an example, the tuning component 110 is configured to implement a tuning algorithm. The tuning algorithm is configured to determine values for the first set of tuning parameters (used by the Digital Self-Interference cancellation component 102) and the second set of tuning parameters (used by the Radio Frequency Self-Interference Cancellation component 104), that minimize the effect of self-interference in the received signal.

In an example the image reconstruction component 101 is configured to communicate information to the tuning component 110 via a second output. In an example, the information includes information identifying an amount of self-interference in the received signal. In the system of FIG. 1, a tuning algorithm implemented by the tuning component 110 is configured to generate a plurality of tuning parameters and select the set of tuning parameters that minimizes the amount of self-interference in the received signal. An example self-interference tuning algorithm for use with the static dish antenna of FIG. 1 is described in U.S. patent application Ser. No. 17/354,647, which is incorporated herein by reference.

For static antennas (i.e. antennas that do not move position/orientation in use), the clutter can be considered part of the self-interference since the echoes due to the clutter are approximately constant, in the same way that other sources of self-interference (e.g. leakage between the transmit and the receive path, reflections from the antenna etc. are constant). As a result, for static antennas (such as that shown in FIG. 1), the clutter can be treated as part of the Self-interference and can be removed by appropriate tuning of the Digital Self-Interference cancellation circuit 102, and appropriate tuning of the RF Self-Interference cancellation circuit 104. However, for moving antennas (i.e. for antennas that rotate) this is not the case.

Figure 3A:
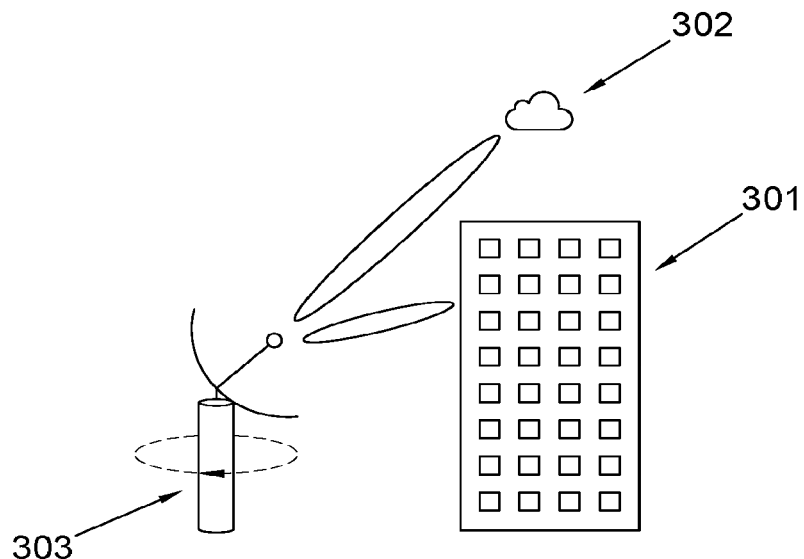
FIG. 3A shows a side view of an example radar system with a rotating antenna.

FIG. 3A shows a side view of an example radar system with a rotating antenna. In particular, FIG. 3A shows the antenna 303, which rotates to scan an area (e.g. the sky) containing a rain cloud 302. In an example, the antenna 303 is positioned in an urban environment containing a building 301. In this example the radar system (comprising the antenna 303) is a weather radar. When a radar signal is transmitted by the antenna 303, a reflection is generated by the building 301 and the rain cloud 302. In this case the building 301 generates echoes (i.e. reflections) that will be displayed on the radar. The echoes from the building 301 are unwanted signals since the purpose of the radar system is to observe the weather. Consequently, these unwanted signals should be removed so that the true target (e.g. the rain cloud 302) can be imaged. Similarly in other examples where the radar system is used for a different purpose (e.g. for observing moving targets) then the echoes from buildings 301 would also represent "unwanted signals" since those signals are not the moving targets (i.e. the objects that are to be observed by the radar system).

Figure 3B:
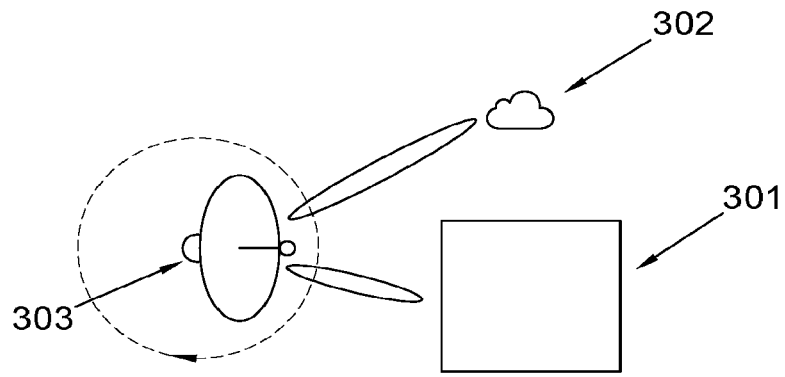
FIG. 3B shows a plan view of the example radar system.

FIG. 3B shows a plan view of the example radar system. In the case where the antenna 303 is a rotating antenna, the clutter (i.e. the presence of an unwanted signal) depends on the direction the radar antenna 303 is pointed in. Consequently, the amount of clutter in a received signal may vary as the radar antenna 303 rotates.

As an example, consider a system similar to that shown in FIG. 1. However, instead of the static dish antenna there is provided a rotating dish antenna. The rotation of the antenna causes the reflected power due to clutter to vary as the antenna rotates, as it scans different parts of the terrain. Consequently, the reflected power due to clutter could be large or small depending on the angle of rotation. If a static SiC tuning algorithm is used when the antenna is pointing towards a low source of clutter, the RF and Digital SiCs will be optimized for that region (i.e. a region without any echoes due to clutter). Once the antenna rotates, any change in the clutter (e.g. due to the antenna now facing a direction with buildings) could result in a large reflection.

Figure 4A:
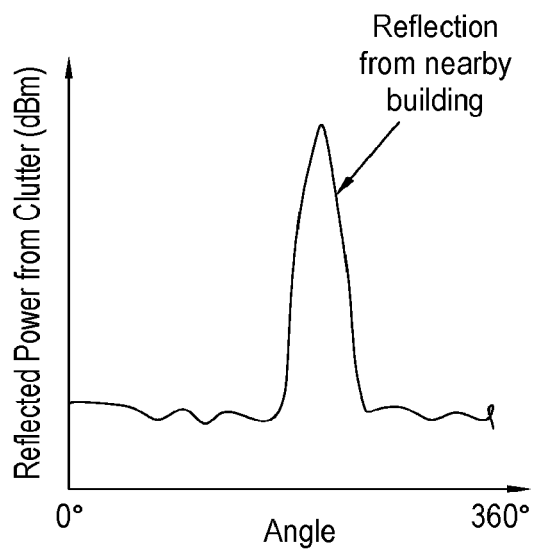
FIG. 4A shows a reflected power from clutter as a function of antenna angle according to an example.

FIG. 4A shows a reflected power from clutter as a function of antenna angle according to an example. As discussed above, for a rotating antenna the amount of clutter can vary depending on the angle of rotation. As a result, the reflected power due to clutter can also vary depending on the angle. FIG. 4A shows a peak in reflected power due to clutter from a nearby building.

If the tuning algorithm is performed when the antenna faces a different direction (e.g. when there is little/no clutter, such as 10 degrees) then RF and Digital SiCs will use filter taps that are not optimized for the high-clutter region, resulting in a reduced level of Self-Interference Cancellation.

Figure 4B:
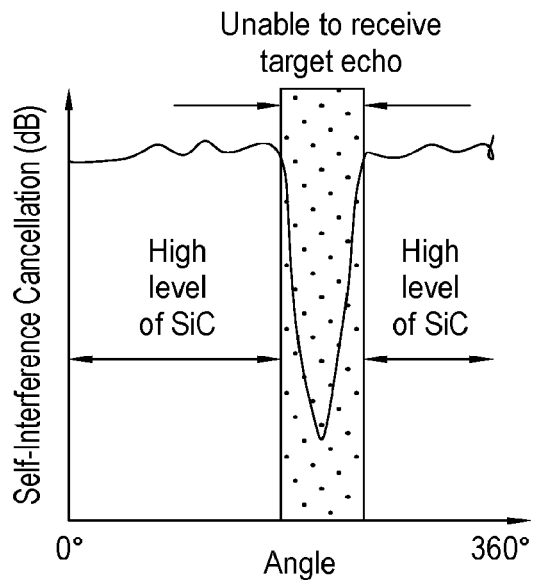
FIG. 4B shows an amount of self-interference cancellation performed by the system as a function of antenna angle according to an example.

FIG. 4B shows an amount of self-interference cancellation performed by the system as a function of antenna angle according to an example. In particular, FIG. 4B shows that when the RF and Digital SiCs use filter taps that are not optimized for the high-clutter region, there will be a reduction in self-interference cancellation, resulting in large amounts of self-interference in the output signal, which can prevent the intended signal (e.g. the reflection not from the clutter) from being identified. In this case, the clutter can create a blind region during which Full-Duplex (FD) operation is not possible.

In this example, the RF and Digital Self-interference filters are tuned in an angular region where there are reduced reflections from clutter, which results in poor performance when operating in regions of high clutter. However the converse is also true. For example, the RF and Digital Self-interference components may be tuned in a region of high clutter, resulting in poor performed when operating in regions of low clutter.

In light of this, there is a need for a new approach for use with rotating antennas.

Figure 5:
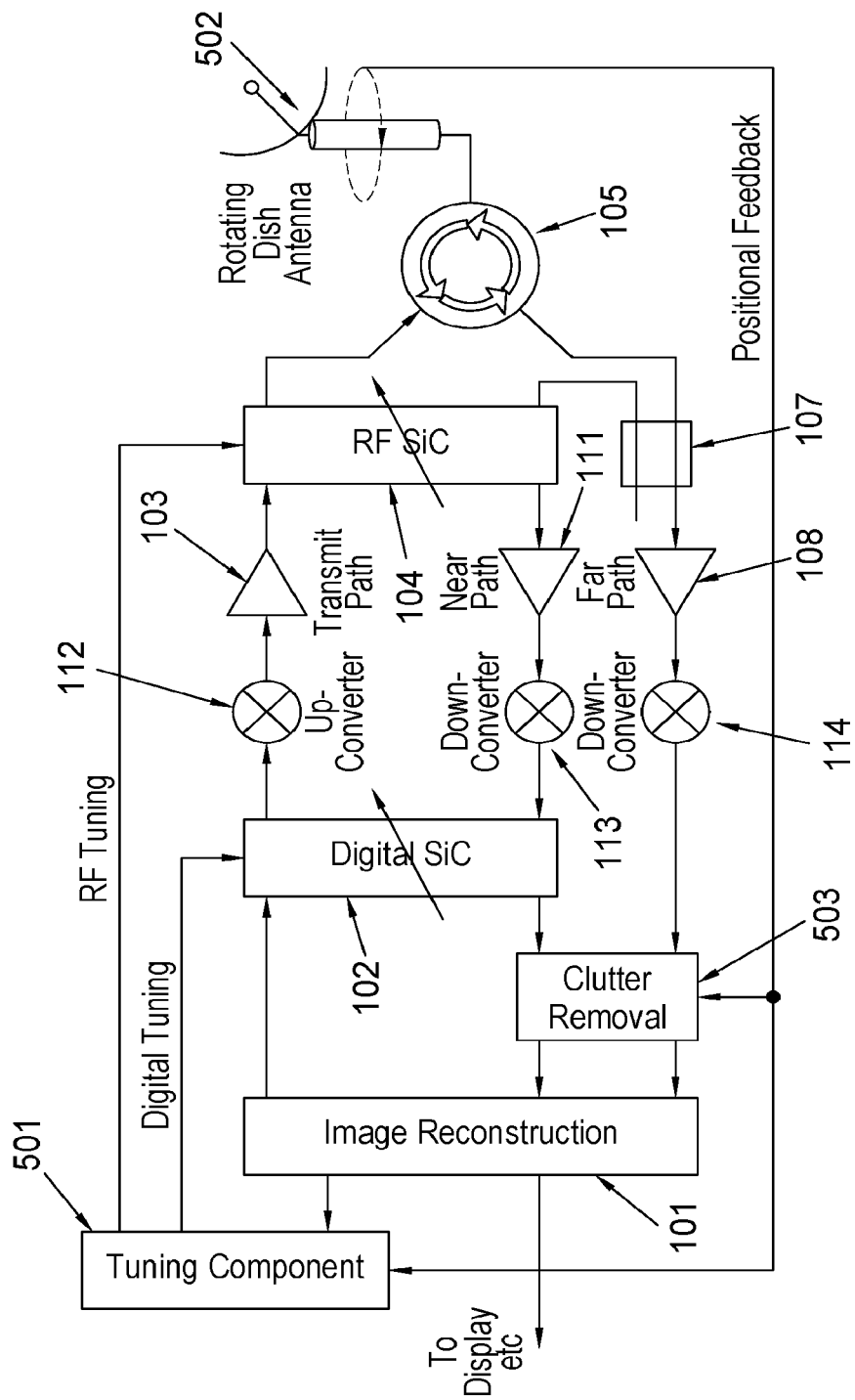
FIG. 5 shows a Full Duplex (FD) radar system using a rotating antenna according to an example.

FIG. 5 shows a Full Duplex (FD) radar system using a rotating antenna according to an example. FIG. 5 uses same reference numerals as FIG. 1 to denote same components. In the system of FIG. 5 there is provided a rotating antenna 502, specifically a rotating dish antenna. The rotating antenna 502 rotates to scan a large area (e.g. the sky) for objects of interest (e.g. precipitation). The rotating antenna 502 comprises a first input/output connection and a second output connection.

The first input/output connection is coupled to the second port of the circulator 105 and is configured to receive a transmit signal (e.g. a radar pulse) from the second port of the circulator 105 to be transmitted via the rotating antenna 502, and provide a received signal (received via the antenna dish) to the second port of the circulator 105 for processing by the receive path.

The second output of the rotating antenna 502 comprises positional feedback generated by the rotating antenna 502. The positional feedback comprising position information, indicating an angular direction of the rotating dish antenna (e.g. indicating the direction that the rotating dish antenna is pointed in). In an example, the position information comprises an angle (e.g. an azimuth angle), represented in degrees, which the rotating antenna 502 is pointed in. The second output of the rotating antenna 502 is coupled to a tuning component 501 and a clutter removal component 503. In this way, the positional feedback information generated by the rotating antenna 502 is provided to the clutter removal component 503 and the tuning component 501.

As will become apparent from the description below, the system of FIG. 5 uses the position information to select and update the tuning parameters of the Digital Self-interference Cancellation Component 102 and the tuning parameters of the RF Self-Interference Cancellation Component 104 as the rotating antenna 502 rotates. In this way, the filters are always appropriately configured to reduce the effect of clutter (which as discussed above, is a function of antenna angle).

Figures 6A, 6B, 6C:
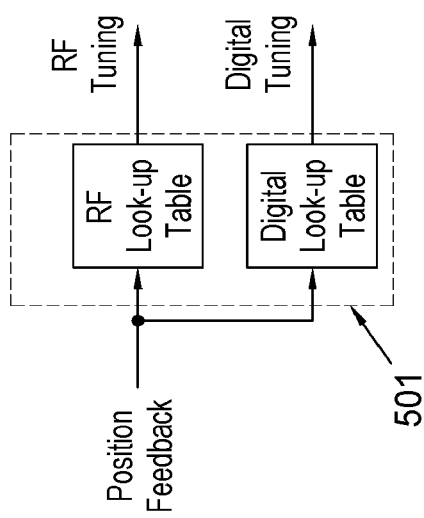
FIG. 6A shows a tuning component 501 according to a first example.
FIG. 6B shows an RF Look-up table according to an example.
FIG. 6C shows a digital look-up table according to an example.

FIG. 6A shows a tuning component 501 according to a first example. The tuning component 501 comprises a first input for receiving position information. Optionally, the tuning component 501 also comprises a second input (not shown) for receiving information identifying or associated with an amount of self-interference in the received signal. As will be apparent from the description below, the second input is used during the tuning mode of operation. The tuning component 501 comprises a first set of RF tuning parameters and a second set of Digital tuning parameters.

The first set of RF tuning parameters comprises a plurality of tuning parameters, wherein each tuning parameters in the plurality of tuning parameters indicates a configuration of the Radio Frequency (RF) filter in the RF Self-Interference Cancellation component 104 (specifically the attenuation and phase shift applied by the RF filter). Likewise the second set of digital filter parameters comprises a plurality of parameters, wherein each filter parameter indicates a configuration of the Finite Impulse Response (FIR) filter in the digital self-interference cancellation component 102.

As discussed above, the echoes produced by clutter can be viewed as Self-Interference when the antenna is static and the effect of these echoes in the received signal can be reduced using digital and RF Self-Interference cancellation. In the system of FIG. 5, the Digital self-interference cancellation components 102 and the RF self-interference cancellation component 104, provide self-interference cancellation to reduce the effect of echoes from clutter on the desired signal. However, unlike the approach discussed in FIG. 1, where the tuning parameters of the self-interference cancellation filters are static (i.e. they do not change in use), in the system of FIG. 5, the tuning parameters of the self-interference cancellation components (e.g. the coefficients of the Finite Impulse Response filter in the Digital SiC component 102, and the attenuation and phase shift values of the RF SiC component 104) are updated based on the angle of the rotating dish antenna. In this way, the effect of clutter can be reduced using the self-interference cancellation filters for angles where clutter is present, without effecting the performance at other angles of antenna rotation where clutter is not present. Consequently, in the system of FIG. 5, the effect of the clutter in the received signal is reduced in the near receive path before the signal is inputted to the clutter removal component 503, improving the final signal output by the clutter removal component 503 to the image reconstruction component 101.

As discussed above, the tuning component 501 comprises a first set of RF tuning parameters and a second set of Digital tuning parameters. The first set of RF tuning parameters comprises a value of the variable attenuator and phase shift associated with each antenna angle. In an example, the first set of RF tuning parameters is stored in the form of an RF Look-Up table.

FIG. 6B shows an RF Look-up table according to an example. In particular, FIG. 6B shows a look-up table that associates an antenna angle with a phase shift and an attenuation to be applied by the variable attenuator and phase shifter in the RF self-interference cancellation component 104. In the example of FIG. 6B the phase shift is stored in the look-up table in degrees and the attenuation expressed in decibels (dB). However, for the avoidance of any doubt it is emphasized that different units may be used instead.

In the look-up table of FIG. 6B there is an entry for each angle, at a predetermined resolution, for the angular range of the rotating antenna. For example, in an example where the rotating dish antenna 502 is configured to rotate 360 degrees, there is an entry for each angle within the 360 degree rotation angle. In the example of FIG. 6B, the angular resolution of coefficients is 1 degree. Consequently, there are 360 rows in the look-up table, associating each angle (in 1 degree increments) with a phase shift and an attenuation value. In another example, the antenna angle of the look-up table denotes an angular range (e.g. 160 degrees to 180 degrees).

In use, the tuning component 501 is configured to receive positional feedback from the rotating antenna. As discussed above, the positional feedback comprises an indication of the angle of the rotating dish antenna (e.g. a current azimuth angle relative to a reference). The tuning component 501 is configured to determine a phase shift and an attenuation based on the received positional feedback (e.g. by looking up the entry in the RF look-up table that is associated with the same antenna angle as the positional feedback). The tuning component 501 is configured to output the information identifying the determined phase shift and attenuator value to the RF self-interference cancellation component 104. In response to receiving the information identifying the determined phase shift and attenuator value, the RF self-interference cancellation component 104 is configured to configure the variable attenuator and phase shifter 202 according to the received information (i.e. to implement the determined phase shift and attenuator value). A similar approach is followed for controlling the digital self-interference cancellation filter.

FIG. 6C shows a digital look-up table according to an example. In particular, FIG. 6C shows a look-up table that associates an antenna angle with a coefficient for each of the FIR filter taps in the FIR filter implemented by the Digital Self-Interference Cancellation Component 102.

In an example, there is an entry in the look-up table for each antenna angle that the antenna can be rotated to. In the example where the digital self-interference cancellation component is implemented using an N-tap FIR filter (N being an integer greater than or equal to one), each angle in the digital look-up table is associated with a coefficient for each tap of the N-tap filter (i.e. there are N filter coefficients associated with each angle in the look up table).

As discussed above, in use, the tuning component 501 is configured to receive positional feedback from the rotating antenna 502. In response to the tuning component 501 receiving the positional feedback comprising information identifying an angle of the rotating dish antenna (e.g. an azimuth angle of the antenna), the tuning component 501 is configured to determine a configuration of the FIR filter based on the received positional feedback. In an example the tuning component 501 is configured to obtain the FIR filter tap coefficients associated with the received angle. The tuning component 501 is further configured to output information identifying the respective filter tap coefficients (i.e. the coefficients of each of the N filter taps associated with the angle indicated by the positional feedback) on the second output of the tuning component 501. The second output of the tuning component 501 is coupled to the third input of the Digital Self-Interference Cancellation component 102. The Digital Self-Interference Cancellation component 102 subsequently receives the information identifying the filter tap coefficients, and in response to receiving this information, configures the FIR filter according to the received information (e.g. by setting each respective filter tap to use the coefficient specified in the information identifying the filter tap coefficients).

In an example, the RF Look-up table and the Digital Look-Up table are stored in memory, optionally in persistent memory, which is accessible by the tuning component 501.

The tuning component 501 comprises two modes of operation. A first mode of operation is the 'tuning' mode (also referred to as calibration) where the tuning component 501 determines the coefficients to configure the RF Self-Interference Cancellation Component 104 (e.g. the phase shift and attenuation values to be applied by the variable phase shifter and attenuator 202) and also determines the coefficients to configure the Digital Self-Interference Cancellation circuit 102 (e.g. the coefficients for each filter tap in the FIR filter). As will be discussed in more detail below, during the tuning mode the tuning component 501 is configured to tune the self-interference cancellation circuits. In brief, tuning the self-interference cancellation circuits comprises determining coefficient values at each angle of the rotating antenna that minimize the self-interference, and populating the coefficient values in the look up tables (e.g. the RF Look-up table and the Digital Look-up table) for future use.

The second mode of operation is the 'use' mode where the tuning component 501 receives position information and configures the Digital Self-Interference Cancellation component 102 and the RF Self-Interference Cancellation component 104 according to the coefficients stored in the RF Look-up table and the Digital Look-up table associated with the received position information (i.e. the received angle).

The first mode of operation (i.e. the tuning mode) will now be discussed in detail.

Figure 7A:
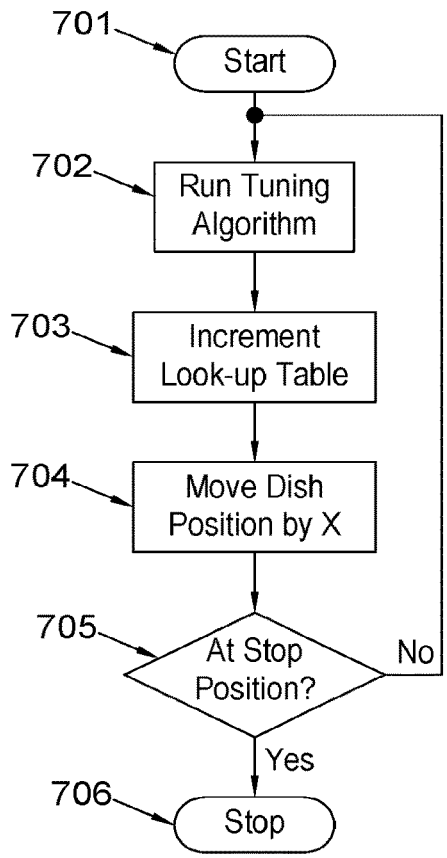
FIG. 7A shows a method of tuning the radar system according to an example.

FIG. 7A shows a method of tuning the radar system according to an example. In an example, the method of tuning shown in FIG. 7A is performed by the tuning component 501. The method starts in step 701 with the rotating antenna 502 facing a first angle (e.g. 0 degrees relative to a reference). The method proceeds to step 702.

In step 702, a tuning algorithm is implemented by the tuning component. In general, the tuning algorithm performed in step 702 is configured to determine a set of tuning parameters (e.g. filter coefficients for the FIR Filter in the Digital Self-Interference Cancellation component 102 and coefficients for the RF self-interference cancellation components) that minimize a metric of the received signal after self-interference cancellation.

In an example, the tuning algorithm is configured to generate a set of tuning parameters that minimizes the sum of 1) the self-interference channel impulse response (representing the effect of self-interference, which for a fixed antenna angle, includes echoes from clutter such as nearby objects) and 2) the cancellation signals generated by self-interference cancellation circuits.

In this way, during tuning, parameters of the self-interference cancellation components are generated that reduce the effect of self-interference at the specific angle of the rotating antenna. This means that, in the use mode, the signal at the output of the self-interference cancellation circuit will predominantly contain the desired signal (e.g. reflections from objects of interest) and not reflections from clutter or self-interference, since these signals will be cancelled by the self-interference cancellation filters which feeds a portion of the transmit signal into the receive path.

In an example running the tuning algorithm in step 702 comprises determining a first set of tuning parameters for configuring the RF Self-Interference Cancellation (SiC) Component 104 such that the first set of tuning parameters minimize an effect of self-interference and clutter in the received signal and then (i.e. subsequently) determining a second set of tuning parameters for configuring the Digital Self-interference Cancellation (SiC) component 102 that further minimizes the effect of self-interference and clutter in the received signal. In this way, the RF Self-Interference Cancellation (SiC) component 104 and the associated set of tuning parameters acts as a "coarse" tuning/setting and the Digital Self-Interference Cancellation component 102 acts as a "fine" tuning/setting.

In an example, the tuning algorithm used in step 702 is the algorithm described in U.S. patent application Ser. No. 17/354,647, which is incorporated herein by reference.

After tuning the parameters of the self-interference cancellation components in step 702, the method proceeds to step 703. In step 702 a set of parameters for each of the digital self-interference cancellation component and the RF self-interference cancellation component are obtained that minimize the self-interference. As discussed above, when the antenna is stationary any echoes from clutter can be considered to be part of the self-interference. In step 702 the antenna is static (i.e. the tuning algorithm is performed with a stationary antenna, i.e. with a fixed angle). Consequently, the obtained tuning parameters for the self-interference cancellation component also reduce the effect of clutter in the received signal.

In step 703 the tuning parameters obtained in step 702 are stored in the first set of RF parameters and the second set of digital parameters and are associated with the angle of the antenna when step 702 was performed. In an example, the parameters obtained from step 702 are added to (or in other words, included in) the RF look up table and the digital look-up table at an entry corresponding to the angle of the antenna. In step 703 the method increments the look-up table. Optionally a pointer (e.g. a reference) is maintained indicating the entry of the look-up table (i.e. the angle) for which the tuning algorithm is being performed. In step 703 this pointer is incremented to reference the next entry in the look up table. The method proceeds to step 704.

In step 704 the rotating antenna is moved to a next position. In step 704 the rotating antenna 502 is moved to the antenna angle associated with the row of the Look up table that was incremented to in step 703. In an example the Look up table comprises an entry associated with each angle, within an angular range, at a specified resolution.

For example, in one example, the look up table comprises an entry associated with each angle within a 360 degree angular range at a 1 degree angular resolution, hence 360 angles/entries (containing, for example, 180, 181, 182, 183 degrees etc.). In an example, the angles are arranged in ascending or descending order. Consequently, the difference between a previous entry of the look-up table and the next entry in the look up table equals the angular resolution (which in this example is 1 degree). Consequently, in step 704 the rotating dish antenna 502 is moved by the angular resolution (e.g. 1 degree) to the next position. In general, step 704 comprises moving the rotating dish antenna 502 to the angle associated with the next entry in the look up table (e.g. obtained after incrementing the look-up table in step 703). After moving the rotating dish antenna 502 in step 704, the method proceeds to step 705.

In step 705 the method determines whether the rotating dish antenna 502 is at a stop position. In an example, the stop position is predetermined. In an example, the stop position is the angular range from the start angle. For example, when the start position is 0 degrees and the angular range is 360 degrees, the stop position is 360 degrees (or equivalently 0 degrees). Consequently, in this case the rotating dish antenna 502 has rotated in increments of 1 degree in a complete circle, thereby obtaining tuning parameters for each angle within the 360 degree angular range. More generally, in step 705 it is determined whether the turning algorithm has been performed for each of the angles associated with entries in the first set of RF parameters and the second set of digital parameters. For example, where the first set of RF parameters comprises 360 entries, each associated with a different angle (e.g. 1, 2, 3, 4, 5 degrees etc.), then step 705 comprises determining whether a tuning algorithm has been performed with the rotating antenna 502 at each of the different angular positions. Or put in other words, whether tuning has been completed for all of the entries in the look up tables.

If, in step 705, it is determined that the stop position has been reached (or equivalently that a set of filter parameters has been obtained for each angle in the RF look up table and the digital look up table) then the method proceeds to step 706 where the tuning method is stopped (since tuning is complete).

If, in step 705, it is determined that the rotating antenna 502 has not reached the stop position, or equivalently, that there are angles in the RF look up table and the digital look up table that the tuning algorithm has not been performed for. Then the method proceeds to step 702, where the tuning algorithm is run again. In this case, the tuning algorithm will be performed for the antenna angle that the rotating antenna was moved to in step 704.

Once the tuning process is complete (i.e. in step 706), there will be two sets of parameters. A first set of RF tuning parameters, and a second set of digital tuning parameters. The first set of RF tuning parameters comprise configuration values for the RF self-interference cancellation component associated with each angular position of the rotating dish antenna. Likewise the second set of digital tuning parameters comprise configuration values for the digital self-interference cancellation component associated with each angular position of the rotating dish antenna 502.

As discussed above, the tuning component 501 has two modes: 'tuning' mode, and 'use' mode. In tuning mode, filter parameters for each angle of the rotating dish antenna 502 are obtained that minimize the self-interference (which also reduces the effect of echoes from clutter, when the antenna is at that angle). In 'use' mode, the obtained filter parameters are then used by the system to configure the digital and RF self-interference cancellation components.

Figure 7B:
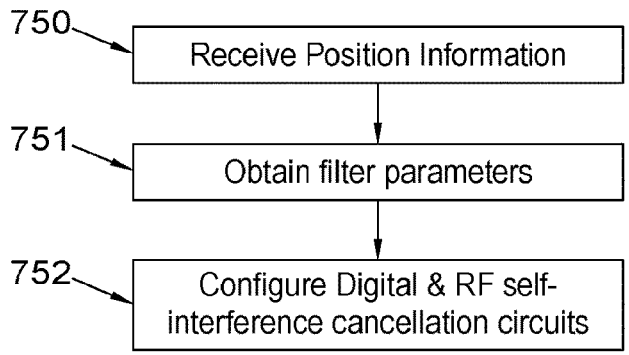
FIG. 7B shows a method of operating the tuning component according to an example.

FIG. 7B shows a method of operating the tuning component according to an example. In an example, the method of FIG. 7B is performed after a tuning/calibration phase (i.e. once the RF and digital look up tables have been populated with tuning parameters for each angle). The method begins in step 750. In step 750 the tuning component 501 receives position information (e.g. an angle of the rotating dish antenna 502). The method proceeds to step 751.

In step 751 the tuning component 501 identifies the tuning parameters associated with the received position information (e.g. by looking up the tuning parameters associated with the received angle in the RF look-up table and the digital look-up table). The method proceeds to step 752.

In step 752 digital and RF self-interference cancellation components are configured according to the tuning parameters obtained in step 751. In an example, the tuning component 501 transmits information identifying the configuration of the digital self-interference component 102 obtained in step 751 to the digital self-interference cancellation component 102, and in response, the digital self-interference cancellation component 102 configures itself according to the received information. In an example, the information identifying the configuration of the digital self-interference cancellation component 102 comprises coefficients for the FIR filter. In this case, the digital self-interference cancellation circuit configures the FIR filter to use the received filter parameters. Likewise, in step 752 the tuning component 501 transmits information identifying the configuration of the RF self-interference cancellation component obtained in step 751 to the RF self-interference cancellation component 104, and in response to receiving the information, the RF self-interference cancellation component 104 configures itself according to the information. In an example, the RF self-interference cancellation component 104 adjusts the phase shift and the attenuation applied to the transmit signal based on the received information.

In an example, the angle of the rotating dish antenna 502 is controlled by a separate controller. Consequently, the movement of the rotating dish antenna 502 and the configuration of the digital and RF self-interference cancellation components is performed by separate processes. In an example the rotating dish antenna 502 is controlled by a rotational controller that sets a constant speed. In this example a rotary encoder is used to generate position information for the rotating dish antenna, which is subsequently provided as the positional feedback to the tuning component 501. In a different example the angle of the rotating dish antenna 502 is controlled by the tuning component 501.

In an example, during operation, the values of the variable elements in the RF and Digital SiCs are continually updated, 360 times in a rotation as described above. More generally, in the system of FIG. 5, the variable elements in the RF and Digital SiC components are continuously switched between different values depending on the positional feedback from the rotating antenna.

In the example above, tuning parameters are obtained for each received position information (e.g. for each received angle). Consequently, in one revolution, the digital and RF self-interference cancellation components are updated 360 times.

In another example, there may be only a small difference in the amount of clutter between two adjacent angles. Furthermore, the amount of self-interference generated by the components of the system (e.g. due to reflections/coupling) is likely to be the same since these effects are not a function of antenna angle. Consequently, in some examples it is possible that the tuning parameters to configure the Digital self-interference cancellation component 102 and RF self-interference cancellation component 104 are similar for a number of adjacent antenna angles.

In an example, after obtaining the tuning parameters in step 751 there is an additional determination step before the tuning parameters are communicated to the RF and Digital self-interference cancellation components. In this step it is determined whether the obtained tuning parameters for the position information received in step 750 are similar to the previously transmitted filter parameters (which are also the current filter parameters used by the digital and RF self-interference cancellation components). The tuning parameters are similar if the difference between the tuning parameters obtained in step 751 and the current tuning parameters is less than a predetermined threshold or percentage.

If the tuning parameters are similar then the obtained filter parameters are not transmitted to the RF and digital self-interference cancellation components (i.e. no update of the tuning parameters is performed). This approach reduces delays (since it is not necessary to wait for the self-interference cancellation filters to be re-configured before transmitting a radar pulse). Furthermore, it also reduces wear-and-tear on the self-interference cancellation filters since the number of reconfigurations is reduced. For example, considering the environment shown in FIG. 3A and FIG. 3B. In this case there is only one source of clutter, so clutter only exists over a small angle. In this case, only updating the tuning parameters when they are not similar to the current tuning parameters results in only a few updates of the tuning parameters since the tuning parameters will likely be similar for the large angle that does not include any clutter.

If it is determined that the obtained tuning parameters are not similar to the currently used tuning parameters, then the method proceeds to step 752 where the tuning parameters are transmitted to the RF and digital self-interference cancellation components and the tuning parameters are stored for subsequently determining whether newly obtained tuning parameters are similar to the tuning parameters that the RF and digital self-interference cancellation components are configured according to.

Returning to FIG. 5. As the rotating dish antenna 502 rotates, positional information is transmitted to the tuning component 501. The tuning component 501 subsequently obtains and transmits tuning parameters to the digital self-interference cancelation component 102 and the RF self-interference cancellation component 104 that were generated, in the tuning/calibration phase, to reduce the amount of self-interference for the given antenna angle.

A radar signal is subsequently transmitted via the transmit path and the rotating antenna. The digital self-interference cancellation component 102 generates a self-interference cancellation signal by tapping off a portion of the transmit signal and filtering the signal using a Finite Impulse Response filter configured according to the filter parameters from the tuning component 501. Likewise, the RF self-interference cancellation component 104 generates a second self-interference cancellation signal by tapping of a portion of the transmit signal and manipulating its amplitude and phase according to the filter parameters from the tuning component 501.

A signal is subsequently received by the rotating dish antenna 502. The signal comprises 1) the self-interference generated by the components of the system (e.g. mismatch and reflections), 2) the echoes generated by clutter (e.g. nearby buildings) and 3) the desired signal (e.g. a reflection from a cloud). During the calibration phase, for the given antenna angle, signals 1) and 2) were present. During this calibration phase filter parameters are obtained that minimize the effect of 1) and 2).

The received signal is coupled to the near receive path. The second self-interference cancellation signal is injected into the receive path by a combiner in the RF self-interference cancellation component 104. The first self-interference cancellation signal is also injected into the near receive path by the digital self-interference cancellation component. Injecting both of these cancellation signals into the receive path reduces the effect of sources 1) and 2) in the received signal. Consequently, the amount of clutter is reduced before the signal enters the clutter removal component 503. After the clutter removal component 503 the received signal is subsequently transmitted to the image reconstruction component 101 for generating a display image.

By updating the digital and RF self-interference cancellation components based on the angle of the rotating dish antenna 502, it is possible to reduce the effect of clutter on the received signal and improve radar system performance.

This is different to previous approaches where the digital self-interference cancellation component 102 and the RF self-interference cancellation component 104 are configured in a static way that does not depend on the angle of the rotating dish antenna 502. As discussed above, when configured in this way, the radar system is unable to obtain suitable performance at angles where there is clutter present as well as angles where there is no clutter present.

In contrast the system of FIG. 5, provides an adaptive system that is able to improve performance by virtue of the making the filter parameters reconfigurable as a function of antenna angle. Consequently, unlike previous approaches, where the filter parameters were constant, in FIG. 5 the filter parameters of the Digital self-interference cancellation component 102 and the RF self-interference cancellation component 104 are updated many times during a rotation of the rotating dish antenna 502. Consequently, the Self-Interference Cancellation Circuits are appropriately configured at each angle of the rotating antenna to minimize the self-interference, which can, depending on the angle of the antenna, include the effects due to clutter.

In the system of FIG. 5, the second output of the rotating antenna 502 (which conveys positional feedback) is optionally coupled to the clutter removal component 503. The clutter removal component 503 comprises at least one Finite Impulse Response filter as discussed in relation to FIG. 2C. In this example, the clutter removal component 503 has a plurality of configurations, each associated with a different angle of the antenna dish 502. In this case the clutter removal component 503 is configured to configure the at least one FIR filter based on the position information. For example, changing the complex coefficients based on the angle of the antenna. This further improves clutter removal. Optionally, the clutter removal component 503 accesses (and optionally stores) a look up table, similar to the digital look up table, that stores configurations of the clutter removal component associated with various angles of the rotating antenna 502.

Figure 8:
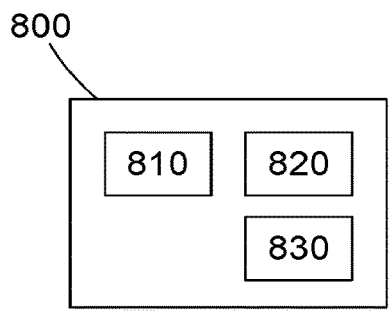
FIG. 8 shows an implementation of a tuning component according to an example.

FIG. 8 shows an implementation of a tuning component according to an example. In particular, FIG. 8 shows a tuning component 800 comprising an input/output interface 810. The input/output interface 810 is configured to receive and transmit electrical signals. In an example, the input/output interface comprises the first output (which, in the system of FIG. 5, is coupled to the Digital Self-Interference Cancellation component 102), the second output (which, in the system of FIG. 5, is coupled to the RF Self-Interference Cancellation component 104), the first input (coupled to the Image reconstruction component 101) and the second input (coupled to the rotating dish antenna 502). The tuning component 800 further comprises a processor 820 (e.g. a Central Processing Unit) coupled to a non-volatile memory 830. The processor 820 is configured to execute instructions stored in the non-volatile memory 830. Execution of these instructions causes the tuning component 800 to perform some of the method steps described herein, including, but not limited to, the method of tuning discussed in relation to FIG. 7A and/or the method of configuring the system as discussed in relation to FIG. 7B. For example, execution of the instructions may cause the tuning component 800 to configure the self-interference cancellation components in a way that minimizes the effect of clutter in the output signal as the rotating dish antenna rotates.

Although in the examples above, a system is used in which the Digital Self-Interference Cancellation component 102 is implemented using a Finite Impulse Response filter and the RF Self-Interference Cancellation component 104 is implemented using a variable attenuator and phase shifter, other implementations are possible and the techniques described herein could still be applied. In particular when the implementation of the Digital Self-interference Cancellation Component 102 and the implementation of the RF Self-Interference Cancellation Component 104 are associated with a first and a second set of tuning parameters the methods described above can be applied by the tuning component, irrespective of the filter's implementation.

Furthermore, in the examples above there are two self-interference cancellation components: a Digital Self-Interference Cancellation Component 102 and a RF Self-Interference Cancellation Component 104. In other examples, there is provided at least one self-interference cancellation component configured to generate a self-interference cancellation signal based on: 1) a transmit signal; and 2) a set of tuning parameters, and that is configured to combine the self-interference cancellation signal with the signal received via the antenna. In further example there is provided more than two self-interference cancellation components.

Furthermore, in the example of FIG. 5 the Digital self-interference cancellation component 102 is provided before the clutter removal component 503 in the receiver chain (i.e. the output of the digital self-interference cancellation component 102 is provided as an input to the clutter removal component 503). In other examples, the Digital Self-Interference Cancellation is provided after the clutter removal component 503 in the receiver chain (i.e. such that an output of the clutter removal component 503 is provided as an input to the Digital Self-Interference Cancellation Component 302).

Furthermore, in the example of FIG. 5, there are two receiver paths (i.e. a near receive path and a far receive path). However, for the avoidance of any doubt it is emphasized that the methods and techniques described herein can be applied to a radar system with at least one receive path (including a single receive path).

Furthermore, in the examples above the image reconstruction component 101 generates the transmit signal (e.g. the digital baseband transmit pulse). However, in other examples a different component generates the transmit signal and provides the transmit signal to the digital Self-Interference Cancellation (SiC) component 102.

In the examples above the Digital Self-Interference Cancellation component 102 operates at baseband. In this case the output on the transmit path is up-converted (e.g. by the up-converter 112) to an RF (transmit frequency). Likewise the received signal on the near receive path is down-converted before being inputted to the Digital Self-Interference Cancellation component 102. In another example, the Digital Self-Interference Cancellation component 102 is adapted to work at the frequency of the transmitted radar pulse. In this example the first up-converter 112, the first down-converter 113 and the second down-converter 114 are not required or present.

Finally, in the examples above reference is made to a Look-up Table (LUT) when discussing the RF Look-up Table and the Digital Look-up Table. In other examples a Look-down table is used instead. For example, in other examples there is provided an RF Look-down table and a Digital Look-down table.

The term coupled used herein means electrically coupled (i.e. connected in a way that permits an electrical current to flow).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A radar system comprising:
a transmit path;
a receive path;
an antenna coupled to the transmit path and the receive path;
a self-interference cancellation component coupled between the transmit path and the receive path; and
a tuning component coupled to the self-interference cancellation component, the tuning component configured to:
obtain information identifying a first position of the antenna;
determine a tuning parameter based on the information identifying the first position; and
transmit the tuning parameter to the self-interference cancellation component, wherein:
the self-interference cancellation component is configured to:
apply self-interference cancellation to a first signal received via the receive path based on:
the tuning parameter; and
a second signal transmitted via the transmit path.

2. The radar system according to claim 1, further comprising:
a controller configured to move the antenna from the first position to a second position; and wherein:
the tuning component is further configured to:
obtain information identifying the second position of the antenna;
determine a second tuning parameter based on the information identifying the second position; and
transmit the second tuning parameter to the self-interference cancellation component; and wherein:
the self-interference cancellation component is further configured to:
apply self-interference cancellation to the first signal received via the receive path based on the second tuning parameter and the second signal transmitted via the transmit path in response to receiving the second tuning parameter.

3. The radar system according to claim 2 wherein the tuning component is further configured to:
transmit the second tuning parameter to the self-interference cancellation component in response to determining that the second tuning parameter is different to the tuning parameter.

4. The radar system according to claim 1, wherein the information identifying the first position of the antenna comprises information indicating an angular direction of the antenna.

5. The radar system according to claim 1, wherein the tuning component comprises a plurality of tuning parameters, wherein each tuning parameter in the plurality of tuning parameters is associated with a different angle of the antenna.

6. The radar system according to claim 5, wherein the tuning component comprises a look-up table comprising the plurality of tuning parameters.

7. The radar system according to claim 1, further comprising:
a second self-interference cancellation component coupled between the transmit path and the receive path;
the tuning component is further configured to:
determine a second tuning parameter based on the information identifying the first position; and
transmit the second tuning parameter to the second self-interference cancellation component; and wherein:
the second self-interference cancellation component is configured to:
apply self-interference cancellation to a third signal provided via the receive path based on:
the second tuning parameter and
the second signal transmitted via the transmit path.

8. The radar system according to claim 1, wherein the tuning component is configured to operate in a tuning mode and wherein in the tuning mode the tuning component is configured to:
cause the antenna to be moved to a second position;
determine a second tuning parameter by tuning the self-interference cancellation component; and
store the second tuning parameter associated with the second position.

9. The radar system according to claim 8, wherein tuning the self-interference cancellation component comprises determining a value of the second tuning parameter that minimizes an amount of self-interference in a signal outputted by the self-interference cancellation component.

10. The radar system according to claim 1, wherein the antenna is a rotating dish antenna.

11. The radar system according to claim 1, wherein the self-interference cancellation component is a digital self-interference cancellation component or a Radio Frequency self-interference cancellation component.

12. A method of operating a radar system, the radar system comprising:
- a transmit path;
- a receive path;
- an antenna coupled to the transmit path and the receive path;
- a self-interference cancellation component coupled between the transmit path and the receive path; and
- a tuning component coupled to the self-interference cancellation component, the method comprising:
- obtaining, by the tuning component, information identifying a first position of the antenna;
- determining, by the tuning component, a tuning parameter based on the information identifying the first position;
- transmitting, by the tuning component, the tuning parameter to the self-interference cancellation component, and
- applying, by the self-interference cancellation component, self-interference cancellation to a first signal received via the receive path based on: the tuning parameter and a second signal transmitted via the transmit path.

13. The method according to claim 12, wherein the system further comprises a controller configured to move the antenna; and wherein the method further comprises:
- moving, by the controller, the antenna from the first position to the second position;
- obtaining, by tuning component, information identifying the second position of the antenna;
- determining, by the tuning component, a second tuning parameter based on the information identifying the second position;
- transmitting, by the tuning component, the second tuning parameter to the self-interference cancellation component; and
- applying, by the self-interference cancellation circuit, self-interference cancellation to the first signal received via the receive path based on the second tuning parameter and the second signal transmitted via the transmit path in response to receiving the second tuning parameter.

14. The method according to claim 13, further comprising:
- transmitting, by the tuning component, the second tuning parameter to the self-interference cancellation component in response to determining that the second tuning parameter is different to the tuning parameter.

15. The method according to claim 12, wherein the information identifying the first position of the antenna comprises information indicating an angular direction of the antenna.

16. The method according to claim 12, wherein the tuning component comprises a plurality of tuning parameters, wherein each tuning parameter in the plurality of tuning parameters is associated with a different angle of the antenna.

17. The method according to claim 16, wherein the tuning component comprises a look-up table comprising the plurality of tuning parameters.

18. The method according to claim 12, wherein the radar system further comprises
- a second self-interference cancellation component coupled between the transmit path and the receive path; and the method further comprises:
  - determining, by the tuning component, a second tuning parameter based on the information identifying the first position; and
  - transmitting, by the tuning component, the second tuning parameter to the second self-interference cancellation component; and
  - applying, by the second self-interference cancellation component, self-interference cancellation to a third signal provided via the receive path based on: the second tuning parameter and the second signal transmitted via the transmit path.

19. The method according to claim 12, wherein the tuning component is configured to operate in a tuning mode and wherein when configured in the tuning mode, the method further comprises:
- causing, by tuning component, the antenna to be moved to a second position;
- determining, by the tuning component, a second tuning parameter by tuning the self-interference cancellation component; and
- storing, by the tuning component, the second tuning parameter associated with the second position.

20. The method according to claim 19, wherein tuning the self-interference cancellation component comprises determining a value of the second tuning parameter that minimizes an amount of self-interference in a signal outputted by the self-interference cancellation component.

* * * * *